United States Patent Office 3,412,176
Patented Nov. 19, 1968

3,412,176
GRAFT COPOLYMERS OF UNSATURATED ALCOHOL SIDE CHAINS ON POLYAMIDE OR POLYESTER SUBSTRATES
Eugene Edward Magat, Spring Valley, Wilmington, Del., and David Tanner, Charlottesville, Va., assignors to E. I. du Pont de Nemours and Company, Wilmington, Del., a corporation of Delaware
No Drawing. Continuation-in-part of application Ser. No. 578,414, Sept. 9, 1966. This application Dec. 21, 1966, Ser. No. 603,460
7 Claims. (Cl. 260—857)

ABSTRACT OF THE DISCLOSURE

Graft copolymers of unsaturated alcohol side chains on a polyamide or polyester substrate give improved dyeability, improved static resistance, and are more wickable.

---

This application is a continuation-in-part of application Ser. No. 578,414, filed Sept. 9, 1966, which is a continuation of application Ser. No. 863,047, filed Dec. 30, 1959, which is a division of application Ser. No. 735,288, filed May 14, 1958, now U.S. Patent 3,188,228, which is a continuation-in-part of our abandoned applications Ser. No. 499,754, filed April 6, 1955, and Ser. No. 503,790, filed Apr. 25, 1955.

This invention is concerned with hydroxyl containing fibers from grafted synthetic polymeric esters and amides.

Graft copolymers have been developed for many end uses. Grafted synthetic linear condensation polymers have been studied less extensively than the addition polymers, since the latter are especially adapted to grafting reactions requiring free radical activity, which may be present as a result of the polymerization process, or may be induced by activating residual unsaturated (double) bonds.

By means of grafts, properties not normally found in condensation polymers may be provided. For example, increased reactivity, improved static resistance, resistance to hold melting and the like can be attained without significant loss in the properties of the substrate polymer.

These and other objects are attained in a graft copolymer comprising (a) a synthetic linear condensation polymer from the class consisting of polyamide and polyester, bearing (b) grafted side chains chemically bonded to the trunk of the said condensation polymer, the said side chains bearing from 100 to 5000 equivalents of hydroxyl radicals per $10^6$ gms. of substrate polymer.

The polyamide which serves as a substrate for grafting is a fiber forming polyamide wherein the amide linkage is an integral part of the polyamide chain. Similarly, the polyesters are those wherein the ester linkage is an integral part of the polymer chain. The grafted polymer chains are bonded by carbon-carbon linkages to the substrate polymer backbone.

The preferred method for producing the product is to graft vinyl acetate to the substrate polymer and then hydrolyze the acetate radicals. The hydroxyl radicals may then be post reacted in any desired fashion. Alternatively, an unsaturated alcohol may be grafted directly. When using ionizing radiation, it is not even necessary to use an unsaturated alcohol since saturated compounds may be activated to bond to the polymer, although with lower radiation efficiency. However, in order to attain the maximum amount of grafting with the minimum amount of irradiation dosage, unsaturated compounds are preferred, particularly those with vinyl unsaturation. Since vinyl acetate is the especially preferred modifier of this invention, processing conditions will be described with respect to its use although other compounds are also exemplified.

Grafting is most conveniently initiated by high energy radiation, such as high energy electrons, X- or gamma-rays. The polymer substrate may be soaked in the modifier either as a liquid or as a solution and the combination irradiated in a single step operation. Alternatively, the polymer substrate may be irradiated at room temperature and then preferably substantially immediately contacted with the modifier in a two-step process. A preferred embodiment of the two-step process is to irradiate the polymer below 10° C., preferably below 0° C. and then contact it with the modifier. Grafting occurs as the combination is warmed.

The polymer substrate may be grafted in the form of flake, by presoaking it in the solution so that sufficient modifier is absorbed to reach the desired weight level. The combination is then irradiated to induce grafting, after which the flake is washed, dried and spun to yarn. Alternatively, fiber or fabric may be treated after it has been spun or woven. This type treatment will usually result in a shorter soaking time due to the smaller dimensions of the substrate polymer. Flake treatment will usually give a greater throughput, promoting efficient use of radiation.

The invention is illustrated by the following examples but it is not limited thereby. Unless otherwise indicated, weight percentages are intended. Irradiation doses are given Mrad where 1 Mrad is equal to 1,000,000 rad.

Example 1

A sample of 66 nylon fabric is soaked in a mixture of 85 parts vinylidene chloride and 15 parts vinyl acetate. After removal of excess liquid by wringing, but while still wet, it is enclosed in an aluminum foil wrapper and subjected to electron irradiation in a 1 mev. resonant transformer with a beam-out current of 560 microamperes. The sample is placed on a conveyor belt which carries it through the electron beam at a rate of 16 inches per minute. At the sample location, the beam supplies an irradiation dose, for textile samples, of $5.6 \times 10^6$ rad (5.6 Mrad) per pass. The sample is traversed back and forth across the beam until a total dose of 33 Mrad is attained. The sample is given 10 washings in household detergent, rinsed in distilled water and dried. Analysis of the fabric shows the presence of 0.54% chlorine, indicating that some of the vinylidene chloride has been permanently attached to the fabric.

The test is repeated, using a 2 mev. Van de Graaff electron accelerator as a source of radiation. The beam-out current 290 microamperes, which gives a dose of 1.66 Mrad per pass as the sample is conveyed under the beam. A total of 20 passes is employed, for a total dose of 33 Mrad. After 15 consecutive standard washings, the fabric is observed to possess greater softness of hand than an uncoated, irradiated comparative control.

Yet another fabric sample is soaked in an excess of the same mixture of monomers, and is irradiated with 2 mev. electrons for a total dose of 30 Mrad. After 10 standard washings, the sample is boiled for 1½ hours in 2 liters of 0.2 N sodium hydroxide. From the weight loss observed, due to hydrolysis of the grafted vinyl acetate, it is calculated that the sample has 598 equiavlents of hydroxyl groups per million grams of substrate polymer. The hydroxyl groups of the hydrolyzed sample are cross-linked by soaking for 15 minutes at 60° C. in an aqueous solution containing 1% maleic acid and 37% formaldehyde followed by heat setting for 3 minutes at 140° C. The test fabric has a wet crease recovery of 80% in the warp direction and 86% in the filling direction, compared to a control 76% (warp) and 79% (fill). The Monsanto crease angle recovery test was used.

Example 2

Four samples of 66 nylon taffeta (coded A to D) are soaked for 20 hours in freshly-distilled vinyl acetate. Each fabric sample is sealed in a polyethylene bag along with 30 ml. of vinyl acetate. Air is excluded from the package. The fabrics are irradiated using the Van de Graaff electron acelerator for the total dosage indicated in Table 1. After irradiation, the fabrics are extracted with acetone for 24 hours, using a Soxhlet extractor, followed by vacuum drying over $P_2O_5$. The observed weight gains are indicated in Table 1.

The combined nylon samples having a total weight of 14 grams, are boiled for 1½ hours in 2 liters of 0.2 N NaOH, thus hydrolyzing the vinyl acetate. The fabrics are then thoroughly rinsed in hot distilled water and dried over $P_2O_5$. The weight loss shows that the grafted polyvinyl acetate is essentially completely hydrolyzed to give polyvinyl alcohol groups. The weight of polyvinyl alcohol per 100 gms. original fabric is tabulated, as well as the equivalent of hydroxyl groups.

TABLE 1.—NYLON WITH GRAFTED POLYVINYL ACETATE

| Sample | Mrad | Polyvinyl Acetate Wt. Gain, percent | —OH groups/$10^6$ gm. of Total Polymer After Hydrolysis |
|---|---|---|---|
| OM-11 A | 2 | 12.9 | 1,200 |
| OM-13 B | 3 | 34.7 | 2,640 |
| OM-15 C | 4 | 49.9 | 3,550 |
| OM-17 D | 5 | 63.0 | 4,250 |

Nylon bearing grafted hydroxyl groups has a drier hand, greater liveliness and improved wickability as compared to control nylon. The log R values are about 12.0, as compared to greater than 13.3 for an unmodified nylon control.

The process is repeated in a continuous manner, using 66 nylon tow as substrate. In this embodiment, a 3 denier per filament tow of nylon is passed through a bath containing vinylacetate. After squeezing excess liquid from the tow, it is irradiated with 2 mev. electrons, excess homopolymer is extracted by passing through an acetone bath, the tow being thereafter dried and cut to staple lengths. The speed of the tow through the process is adjusted to give a radiation dosage of 2 Mrad. Fabric produced by weaving yarn spun from this modified staple is thereafter hydrolyzed. The product has log R and wickability comparable to that observed in the previous test, in which fabric was used as the substrate.

Example 3

A swatch A of polyethylene terephthalate staple fabric is immersed in 1500 g. of 100% vinyl acetate and heated at 60° C. for 30 minutes. The fabric is transferred to a 7" x 11" stainless steel pan containing 200 ml. of the same solution. The fabric is then irradiated by three passes under the beam with 2 mev. electrons at 60° C. for a total irradiation dose of 3 Mrad. The grafted fabric is extracted in boiling acetone for two hours to remove unreacted monomer and unattached polymer, after which it is dried at 80° C. A weight gain of 14% is noted. When the above procedure is repeated with another sample, B, using 1 pass (radiation dose, 1 Mrad) the weight gain is 5.0%.

Sample A is highly dyeable at the boil with disperse dyes, has good dye penetration and rapid dye rate in contrast to an unmodified control fabric, C, which must be dyed with a carrier in order to obtain acceptable shades. Both A and B have increased resistance to caustic hydrolysis; sample B shows an average 60% lower rate of attack than control, C.

A typical procedure for dyeing with dispersed dyes is as follows. A one gram fabric sample is boiled for 2 hours in a 40 ml. bath containing 0.02 gm. of a blue dye (1,4-diamino - anthraquinone - N-α-methoxypropyl-2,3-dicarboximide, disclosed in U.S. Patent 2,753,356), and 0.04 gm. of an anionic hydrocarbon-sodium sulfonate. After dyeing, the sample is scoured for 20 minutes at 82° C. in water containing 2% of a condensation product of ethylene oxide and a fatty alcohol.

Example 4

Fifty grams of 66 nylon flake, ground to pass a 25 mesh screen, is soaked in 100 ml. water for 24 hours, then in 100 ml. of methanol for 24 hours, then in 100 ml. vinyl acetate for 6 hours all at room temperature. The mixture of soaked flake and the vinyl acetate is sealed in a polyethylene bag and is irradiated with 2 mev. electrons to a dosage of 5 Mrad. After irradiation, the flake is left in the vinyl acetate for 60 hours, then is Soxhlet extracted for 24 hours using methyl ethyl ketone. The flake is dried and analyzed for nitrogen; by comparison with the original nitrogen content of the ungrafted flake, it is concluded that 22.1% (based on weight of nylon) of the vinyl acetate has been grafted.

The grafted flake is extruded as filaments at a spinning temperature of 275° C., then drawn to yarn having a tenacity of 4.4 gm./den., an elongation of 15.1% and an initial modulus of 36 gm./den.

The yarn is hydrolyzable to give a graft copolymer having about 2700 equivalents of hydroxyl groups per $10^6$ gms. of polymer; this product shows improved water wickability and electrical conductivity vs. unmodified nylon. The product with grafted hydroxyl groups is cross-linkable with formaldehyde, as shown in Example 1.

The test is repeated, using polyamide flake obtained by polymerizing bis(4-aminocyclohexyl)-methane and dodecanedoic acid. The flake is soaked in a solution of 10 parts vinyl acetate, 7 parts methanol and 3 parts water for 24 hours. The radiation dose is 5 Mrad. After spinning to yarn, drawing, weaving and hydrolysis, the fabric shows improved wickability, conductivity, resistance to oily soil and reactivity to crosslinking reagents, compared to ungrafted fiber.

Example 5

Following the procedure of Example 2, 66 nylon fabric is grafted with vinyl acetate which is then hydrolyzed to the alcohol. The grafted polyvinyl alcohol is 16.8% of the nylon weight, or 3820 equivalents of —OH per $10^6$ gms. nylon.

The grafted fabric is soaked for 1 hour in a solution of 10% hexamethylene diisocyanate in benzene, then removed and heated for 10 minutes at 140° C. It is estimated that about 30% of the hydroxyl groups are crosslinked. The crease recovery at 100% relative humidity, by the Monsanto crease angle recovery test, is 80 and 77% in the warp and filling directions, as compared to 70 and 68% for ungrafted nylon.

Example 6

Vinyl acetate may be grafted to finely ground nylon flake by first irradiating, then immersing in the vinyl acetate solution. 66 nylon flake is radiated to a dose of 5 Mrad, using 2 mev. electrons. The activated flake is immediately dropped into an excess of treating solution consisting of 10 parts vinyl acetate, 7 parts methanol and 3 parts water (by volume). After 24 hours in this solution, the flake is removed, dried and melt spun as in Example 4. The yarn is drawn and woven to fabric. A graft of 23.0% of the acetate (on weight of nylon) is obtained. The graft is then hydrolyzed to the alcohol as before.

Example 7

This example illustrates the direct grafting of unsaturated alcohols to condensation polymer substrates. Fabric samples are soaked for 1 hour at 95° C. in liquid modifiers, as indicated in Table 2, and are then irradiated to a dose of 10 Mrad at the soaking temperature. The samples are washed 5 times to remove excess reagents, and are then dried. In some instances, the weight gain is determined. The time required for a standard drop of water to disappear is listed as wickability in Table 2. It is noted that the grafted alcohols significantly increase the wickability of the nylon.

TABLE 2

| Sample | Substrate [1] | Modifier | Dose, Mrad | Weight Gain, Percent | Wickability, sec. for drop to disappear |
|---|---|---|---|---|---|
| 9A | N | None | None | None | 700 |
| 9B | D | do | None | None | 1,800 |
| 9C | N | Dicyclopentenyl alcohol | 10 | | 34 |
| 9D | N | Allyl alcohol | 10 | 1.4 | 68 |
| 9E | D | Dihydroxydipyrone | 10 | | 630 |
| 9F | N | 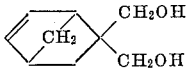 | 10 | 8.1 | 59 |

[1] 66 Nylon fabrics indicated by N, polyethylene terephthalate fabrics by D.

Useful modifiers

In addition to the alcohols indicated above, other hydroxyl-bearing compounds may be grafted such as, for example, furfuryl alcohol, tropolone, 2-hydroxy(2,2,1)-bicyclohept-5-ene, propargyl alcohol, 2-methyl-3-butyn-2-ol, 2,2-dihydroxymethyl-(2,2,1)-bicyclohept-5-ene, 3-hydroxycyclopentene.

It is desirable to graft sufficient modifier so that, after hydrolysis, there remains at least about 100 equivalents of hydroxyl groups per million grams of polymer. The preferred range is from 500 to 2000 hydroxyls, although useful results are often obtained with 5000 or more hydroxyl groups.

Method of application

The substrate polymer may be contacted with the modifier composition before or after irradiation, as already stated. It may be applied to the fiber as a liquid or vapor, or may be applied as a solution or an emulsion. Since some penetration of the composition into the polymer is usually beneficial, especially to improve crease recovery of the product in its final (fiber) shape, choosing a solvent having a swelling effect on the substrate will increase the rate of diffusion. Pre-soaking in the modifier solution before irradiating will also enhance penetration. Alternatively, the polymer may be pre-swollen with swelling agent before contacting with the modifier composition. When contacting pre-irradiated yarn, it is usually helpful to heat the modifier composition to accelerate the reaction. This is especially helpful with polyethylene terephthalate, which grafts best at temperatures above 80° C. In general, however, temperatures of 50 to 150° C. are satisfactory.

It will often be desirable to soak and/or irradiate filaments under sufficient tension to keep them from shrinking. This will help maintain maximum fiber orientation.

Irradiation conditions

By "ionizing radiation" is meant radiation having sufficient energy to remove an electron from a gas atom, forming an ion pair; this requires an energy of about 32 electron volts (ev.) for each ion pair formed. This radiation has sufficient energy to non-selectively break chemical bonds; thus, in round numbers radiation with energy of 50 electron volts (ev.) and above is effective for the process of this invention, although energies of 50,000 ev. and over are preferred. Both particle radiation and ionizating electromagnetic radiation are included.

The preferred radiation for the practice of this invention is high energy ionizing particle radiation; for maximum utility, when using this type of radiation, energy equivalent to at least 0.1 million electron volts (mev.) is preferred. Higher energies are even more effective; there is no known upper limit, except that imposed by available equipment.

The high energy particle radiation is an emission of highly accelerated electrons or nuclear particles such as protons, neutrons, alpha particles, deuterons, beta particles, or the like, directed so that the said particle impinges upon the polymer.

Similarly, ionizing electromagnetic radiation (X-rays) useful in the process of this invention is produced when a metal target (e.g., gold or tungsten) is bombarded by electrons possessing appropriate energy, e.g., 0.1 mev. In addition to X-rays produced as indicated above, ionizing electromagnetic radiation suitable for carrying out the process of the invention may be obtained from a nuclear reactor ("pile") or from natural or artificial radioactive materials, for example, cobalt 60.

The dose rate ("intensity" of dose) is not critical, being primarily a matter of available equipment. In general, high dose rates are preferred as promoting higher throughput.

Efficiency of dose utilization will usually be improved by keeping the fiber and excess monomer mixture in contact for an extended time after irradiation, with either the two-step or one-step process. This will provide maximum opportunity for the radical-initiated chains to grow.

Substrate shape

The product of the instant invention may be grafted before or after converting to its final (i.e. filament) shape, where the modifier, such as vinyl acetate, is sufficiently stable thermally to stand the temperatures required for melt spinning. When the fiber is grafted, it may be grafted before or after drawing. It may be grafted as yarn, staple, flock, tow, or fabric of knitted, fitted, or woven construction.

Subsequent processing

When the grafted polymer of this invention is to be crosslinked, it will usually be desirable to perform this step when it is in a shape which one wishes it to remain. Thus, filaments may be treated in a highly twisted or crimped configuration, or fabric may be treated in a flat or pleated form. Suitable crosslinking agents are formaldehyde, diisocyanates, or diepoxy compounds, whereby fibers of the copolymers of the invention are rendered more resilient, infusible and water repellent. When post-reacted with perfluorocarboxylic acids they become soil repellent and oleophobic.

Other compounds suitable for post-reaction with grafted hydroxyl radicals are diepoxides such as: butadiene diepoxide, dicyclopentadiene diepoxide, vinylcyclohexene diepoxide, divinylbenzene diepoxide, diglycidyl ether.

Substrates

Substrates useful for the graft copolymer of this invention are the synthetic linear fiber-forming polyamides and polyesters. The polyamides are characterized by recurring amido radicals as an integral part of the polymer chain. The amido radicals are linked by divalent organic radicals which may be aliphatic, cycloaliphatic or aromatic, or mixtures of the above. Typical polyamides are poly(hexamethylene adipamide) e.g., 66 nylon, polycaprolactam, poly(hexamethylene sebacamide), polyaminoundecanoamide, poly(hexamethylene isophthalamide), poly(2-methyl hexamethylene terephthalamide, poly(meta - xylylene adipamide), poly(para - xylylene sebacamide), poly(octamethylene oxalamide), and the polyamide from bis(4-aminocyclohexyl) methane and aliphatic acids such as dodecanedioic acid. Copolymers having two or more components, as well as polymer and copolymer mixtures of the above are also included.

In addition to the polyamides, the invention is especially applicable to the crystallizable, linear condensation polyesters. These comprise linear polyesters containing in the polymer carbonyloxy linking radicals

Polymers containing oxycarbonyloxy radicals are comprehended with this group. The polymers should be of fiber-forming molecular weight; usually, this implies a relative viscosity of about 10 or higher as conventionally measured in solution in a solvent for the polymers. A good solvent for most of the linear condensation polyesters is a mixture of 58.8 parts of phenol and 41.2 parts of trichlorophenol. Copolyesters, terpolyesters, and the like are intended to be comprehended within the term "polyesters."

Examples of crystallizable, linear condensation polyesters include polyethylene terephthalate, polyethylene terephthalate/isophthalate (85/15), polyethylene terephthalate/5-(sodium sulfo) isophthalate (97/3), poly(p-hexahydroxylylene terephthalate), polyhydroxypivalic acid, poly(decahydronaphthalene - 2,6 - dimethylene - 4,4'-bibenzoate), polyethylene 2,6- or 2,7-naphthalenedicarboxylate, and poly(bicyclohexyl-4,4'-dimethylene-4,4'-bibenzoate), as well as many others. Preferably, the polyester is a linear gylcol terephthalate polyester. By this is meant a linear condensation polyester derived from a glycol and an organic acid in which the glycol component is comprised substantially of a dihydroxy compound of a divalent saturated hydrocarbon radical containing from 2 to 10 carbon atoms and the acid component is at least about 75 mol percent terephthalic acid.

Utility

The graft copolymers bearing hydroxyl groups according to this invention have improved dyeability, especially when using acidic dyes. They have reduced static propensity as compared to unmodified polymer, and in addition are more wickable, i.e. they absorb water more rapidly. They also resist soiling with oily soil. They have a plurality of reactive radicals which are available as points of attachment for permanent modifying agents.

What is claimed is:

1. A graft copolymer comprising (a) a substrate of a synthetic linear condensation polymer free from aliphatic unsaturation from the class of polyamides wherein the recurring amide linkages are an integral part of the polymer chain or polyesters wherein the recurring ester linkages are an integral part of the polymer chain bearing (b) grafted side chains of unsaturated alcohols chemically bonded to the trunk of the said condensation polymer, the said side chains bearing from 100 to 5000 equivalents of hydroxyl groups per $10^6$ gms. of substrate polymer, the said side chains being linked to the said substrate via carbon-carbon bonds.

2. A graft copolymer as defined in claim 1 where said grafted side chain contains between 500 to 2000 hydroxyl groups per $10^6$ gms. of substrate polymer.

3. A graft copolymer as defined in claim 1 where said grafted side chain is vinyl alcohol.

4. A graft copolymer as defined in claim 1 where said grafted side chain is dicyclopentenyl alcohol.

5. A graft copolymer as defined in claim 1 where said grafted side chain is allyl alcohol.

6. A graft copolymer as defined in claim 1 where said grafted side chain is dihydroxydipyrone.

7. A graft copolymer as defined in claim 1 where said substrate is a yarn of said polyamides or polyesters.

No references cited.

MURRAY TILLMAN, *Primary Examiner.*

P. LIEBERMAN, *Assistant Examiner.*